(12) United States Patent
Mannino

(10) Patent No.: US 8,915,738 B2
(45) Date of Patent: Dec. 23, 2014

(54) DRIVER QUALITY ASSESSMENT FOR DRIVER EDUCATION

(75) Inventor: Matteo T. Mannino, Ann Arbor, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 159 days.

(21) Appl. No.: 13/356,917

(22) Filed: Jan. 24, 2012

(65) Prior Publication Data

US 2013/0189649 A1 Jul. 25, 2013

(51) Int. Cl.
*G09B 9/04* (2006.01)

(52) U.S. Cl.
USPC .................. 434/65; 434/64; 434/236

(58) Field of Classification Search
CPC ........................................... G09B 9/04
USPC ............. 434/65, 236, 64, 69; 340/439, 425.5, 340/576; 348/222.1; 382/118; 701/32.7, 701/424, 29.2, 33; 702/188; 705/4, 14.58, 705/11; 455/456.3; 706/20
See application file for complete search history.

(56) References Cited

U.S. PATENT DOCUMENTS

| | | | | |
|---|---|---|---|---|
| 3,015,169 A | * | 1/1962 | Chedister et al. | 434/65 |
| 4,057,911 A | * | 11/1977 | Sack | 434/64 |
| 4,750,888 A | * | 6/1988 | Allard et al. | 434/69 |
| 4,814,896 A | * | 3/1989 | Heitzman et al. | 386/239 |
| 5,131,848 A | * | 7/1992 | Adams | 434/69 |
| 5,269,687 A | * | 12/1993 | Mott et al. | 434/69 |
| 5,354,202 A | * | 10/1994 | Moncrief et al. | 434/69 |
| 5,362,238 A | * | 11/1994 | Slavin | 434/65 |
| 5,366,376 A | * | 11/1994 | Copperman et al. | 434/69 |
| 5,368,484 A | * | 11/1994 | Copperman et al. | 434/69 |
| 5,577,913 A | * | 11/1996 | Moncrief et al. | 434/69 |
| 5,618,179 A | * | 4/1997 | Copperman et al. | 434/69 |
| 6,227,862 B1 | * | 5/2001 | Harkness | 434/65 |
| 6,488,505 B1 | * | 12/2002 | Hightower | 434/69 |
| 6,652,376 B1 | * | 11/2003 | Yoshida et al. | 463/6 |
| 6,879,969 B2 | * | 4/2005 | Engstrom et al. | 706/20 |
| 6,925,425 B2 | * | 8/2005 | Remboski et al. | 702/188 |

(Continued)

FOREIGN PATENT DOCUMENTS

JP 2008186045 8/2008

OTHER PUBLICATIONS

A comparative Exploration of Eye Gaze and Head Motion Cues for Lane Change Intent Prediction by Anup Doshi and Mohan Trivedi; presented at the 2008 IEEE Vehicles Symposium held at Eindhoven University of Technology, The Netherlands, Jun. 4-6, 2008.*

(Continued)

*Primary Examiner* — Peter Egloff
*Assistant Examiner* — Randall N Crenwelge
(74) *Attorney, Agent, or Firm* — Christopher G. Darrow; Young Basile Hanlon & MacFarlane P.C.

(57) ABSTRACT

A driver performance evaluation and apparatus includes means for generating first data stream representing driver actions, a second data stream representing vehicle movements, a filtering function to eliminate short term actions in both data streams, the generation of a raw score which is independent of timing and the adjustment of the raw score based on a comparison of actual driver action timing to an ideal timing sequence to provide a final score which is an indication of driver performance/proficiency.

6 Claims, 2 Drawing Sheets

(56) References Cited

U.S. PATENT DOCUMENTS

| | | | |
|---|---|---|---|
| 6,974,326 B2* | 12/2005 | Marple-Horvat | 434/236 |
| 6,982,635 B2 | 1/2006 | Obradovich | |
| 7,512,487 B1* | 3/2009 | Golding et al. | 701/424 |
| 7,565,230 B2* | 7/2009 | Gardner et al. | 701/32.7 |
| 7,695,282 B2* | 4/2010 | Lanktree | 434/65 |
| 7,881,838 B2* | 2/2011 | Larschan et al. | 701/29.2 |
| 7,996,345 B2 | 8/2011 | Golding et al. | |
| 8,060,260 B2* | 11/2011 | Huang et al. | 701/1 |
| 8,297,977 B2* | 10/2012 | Freund | 434/65 |
| 8,314,708 B2* | 11/2012 | Gunderson et al. | 340/576 |
| 8,323,025 B2* | 12/2012 | Freund et al. | 434/65 |
| 8,333,592 B2* | 12/2012 | Swan | 434/69 |
| 8,384,534 B2* | 2/2013 | James et al. | 340/439 |
| 8,598,977 B2* | 12/2013 | Maalouf et al. | 340/3.1 |
| 8,628,331 B1* | 1/2014 | Wright | 434/236 |
| 8,770,980 B2* | 7/2014 | Best et al. | 434/65 |
| 2003/0169907 A1* | 9/2003 | Edwards et al. | 382/118 |
| 2004/0158476 A1* | 8/2004 | Blessinger et al. | 705/1 |
| 2005/0216331 A1* | 9/2005 | Ahrens et al. | 705/11 |
| 2007/0015117 A1* | 1/2007 | Freund et al. | 434/65 |
| 2007/0027726 A1* | 2/2007 | Warren et al. | 705/4 |
| 2007/0257781 A1* | 11/2007 | Denson | 340/425.5 |
| 2008/0108022 A1* | 5/2008 | Freund | 434/69 |
| 2008/0122603 A1* | 5/2008 | Plante et al. | 340/439 |
| 2009/0273687 A1* | 11/2009 | Tsukizawa et al. | 348/222.1 |
| 2009/0284361 A1* | 11/2009 | Boddie et al. | 340/439 |
| 2010/0030586 A1* | 2/2010 | Taylor et al. | 705/4 |
| 2010/0209881 A1* | 8/2010 | Lin et al. | 434/65 |
| 2010/0238009 A1* | 9/2010 | Cook et al. | 340/439 |
| 2010/0250021 A1 | 9/2010 | Cook et al. | |
| 2010/0332266 A1* | 12/2010 | Tamir et al. | 705/4 |
| 2011/0077028 A1* | 3/2011 | Wilkes et al. | 455/456.3 |
| 2011/0106370 A1* | 5/2011 | Duddle et al. | 701/33 |
| 2011/0123961 A1* | 5/2011 | Staplin | 434/64 |
| 2011/0314710 A1* | 12/2011 | Luberto | 40/200 |
| 2012/0036016 A1* | 2/2012 | Hoffberg et al. | 705/14.58 |
| 2012/0135382 A1* | 5/2012 | Winston et al. | 434/65 |
| 2012/0202176 A1* | 8/2012 | Dick et al. | 434/65 |
| 2013/0052614 A1* | 2/2013 | Mollicone et al. | 434/65 |
| 2013/0189649 A1* | 7/2013 | Mannino | 434/65 |
| 2013/0302755 A1* | 11/2013 | Voorhees et al. | 434/30 |
| 2013/0316311 A1* | 11/2013 | England | 434/65 |
| 2014/0051041 A1* | 2/2014 | Stefan et al. | 434/65 |
| 2014/1622193 * | 6/2014 | Stankoulov | 434/65 |

OTHER PUBLICATIONS

An Evaluation of Emerging Driver Fatigue Detection Measures and Technologies, Final Report: U.S. Department of Transportation, by Lawrence Barr, Stephen Popkin and Heidi Howarth; dated Jun. 2009.*

Driving With Visual Field Loss: An Exploratory Simulation Study Technical Report for National Highway and Traffic Safety Administration by Julie Lockhart, Linda Ng Boyle and Mark Wilkinson, dated Jan. 2009.*

Nabatilan—Factors That Influence Visual Attention and Their Effects on Safety in Driving: An Eye Movement Tracking Approach; Dissertation for Doctor of Philosophy Degree; Aug. 2007.

* cited by examiner

| Head Pose and Gaze Stream | Head Turn Left dt = 0.5s | Mirror Check dt = 0.5s | Look Straight dt = 1.2s | Speed Check dt = 0.5s |

| Vehicle Action Stream | Straight dt = 1.0s | Drift Left dt = 1.1s | Straight dt = | time

DRIVER QUALITY ASSESSMENT FOR DRIVER EDUCATION

FIELD OF THE INVENTION

The invention relates to a method and system for evaluating vehicle driver performance.

BACKGROUND OF THE INVENTION

The generally accepted method for evaluating driver performance involves a road test in which an instructor or evaluator makes a relatively subjective evaluation of driver skill based on observations. Clearly the evaluation can vary according to the length of the road test, traffic conditions, and many other factors. This approach is not only relatively unreliable but provides little hard information as to whether driver performance is improving or degrading over time.

SUMMARY OF THE INVENTION

The present invention provides methodology and system for objectively evaluating driver performance by scoring pre-selected driver actions associated with pre-selected vehicle movements or maneuvers against stored standards. Thus the system has the capability of providing cumulative information showing driver improvement or lack of same over a period of time.

In the preferred embodiment, the method disclosed herein comprises the steps of generating a first data stream representing sequences of driver actions, filtering spurious data from the data stream, generating a second data stream representing vehicle actions and, for each vehicle action which can be correlated with a set of driver actions, producing a score for the associated driver action sequence against a standard sequence representing, for example, an ideal sequence or series of driver head positions and/or gaze directions. In the preferred process, spurious data is eliminated by a mode filtering step in which a most common data value within a sample window is determined.

Also in the preferred embodiment, the scores generated as above are then adjusted based on a comparison of the times required by the driver to perform the actions in each sequence relative to an ideal timing standard derived, for example, from records of the action times of experienced drivers. In the preferred embodiment, the scores are used to produce a running average with values, for example, between 0 and 1 so that at the end of an evaluation, the driver and/or the driver's coach or instructor/evaluator has a simple score which can easily be compared to previous scores to determine the driver's individual progress.

In accordance with the invention, the apparatus associated with the method can comprise a camera mounted in the vehicle to face the driver to track head position and, in the most sophisticated embodiment, the driver's gaze. The camera generates the aforesaid data stream and delivers this data stream to a processor for the filtering and scoring functions. The head poses and gaze states may, by way of example, include head turn left, head turn right, head look forward, partial head turn left (for side mirror check), partial head turn right (for side mirror check), looking forward, looking at rear view mirror and a null position when the driver looks at other objects.

In addition, the vehicle actions or maneuvers are preferably monitored by means of electromechanical sensors associated with the steering system and transmission but may, in more sophisticated systems, include additional optical devices to detect road edge and lane stripes, or a GPS position monitoring system.

As indicated above, driver action data is generated in a moving window so that the driver actions taken early in or just prior to a vehicle action are available for evaluation as part of an associated sequence. The window may, by way of example, be ten seconds in length so the evaluation of, for example, a left lane change may include a determination as to whether the driver made a timely check of the left outside mirror and the left window blind spot prior to making the lane change. The data window also is long enough to include driver actions taken at the late stages of or just after a vehicle action; for example, a rear view mirror check and a speed check after having made a lane change.

Further features and advantages as well as details of the invention will be apparent from reading the following Detailed Description of an Illustrative Embodiment, which description is to be taken with the accompanying drawings.

BRIEF SUMMARY OF THE DRAWINGS

The description herein makes reference to the accompanying drawings wherein like reference numerals refer to like parts throughout the several views and wherein.

DETAILED DESCRIPTION OF THE ILLUSTRATIVE EMBODIMENT

Figure 1:
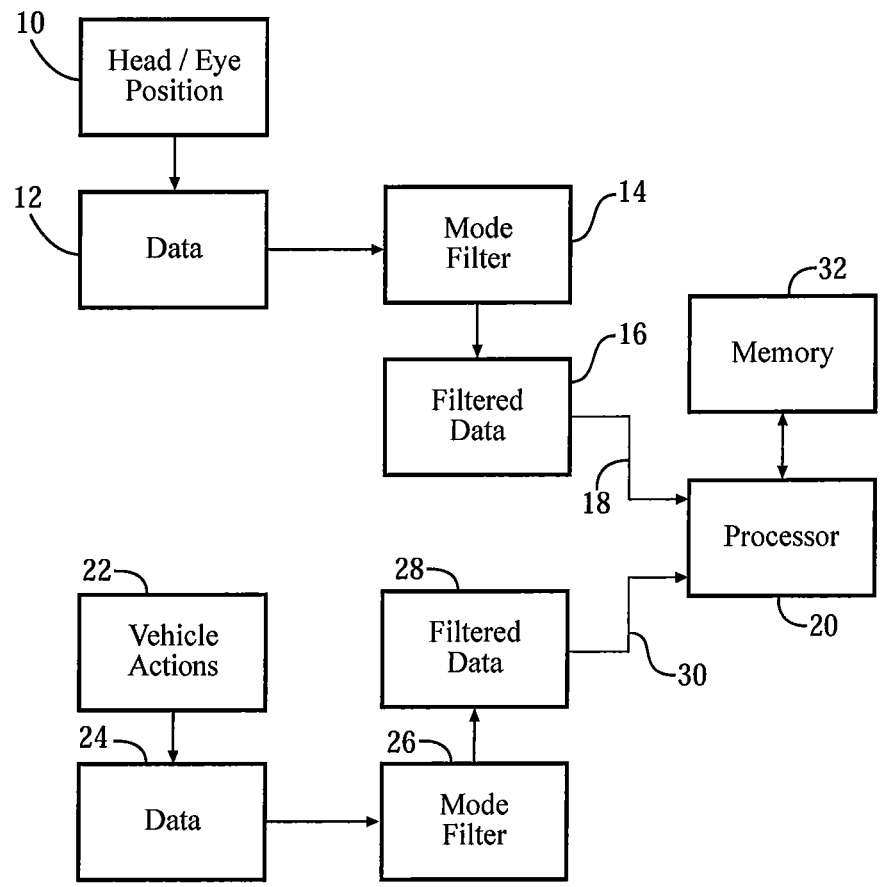
FIG. 1 is a block diagram of a system for carrying out the method described herein.

Referring to FIG. 1, a system for driver evaluation is shown to comprise a digital camera 10 which is mounted within a vehicle (not shown) for producing a running data stream representing the head position and, if desired, gaze position of the vehicle driver. The camera 10 produces a data stream 12 representing a sequence of driver head poses and gaze directions, each of which is given a unique value. This data stream is connected to a mode filter 14 which filters out spurious (short term) driver actions or head positions which are held for less than a predetermined time interval and are deemed irrelevant to driver performance. The mode filter 14 filters out spurious data by establishing a window of predetermined time length and choosing the most common head pose value within the sampling window as representative of the head or eye position which will be used for further processing purposes. The filtered data is represented by block 16 which is a running sequence of measured driver head positions, appropriately filtered as described above, in a moving interval window of ten seconds. This data is provided as a first input 18 to a processor 20 hereinafter described in greater detail.

The system further comprises a set of vehicle mounted transducers 22 associated, for example, with the steering system and transmission for producing a second data stream representing maneuvers of the vehicle such as drifting left, turning left, drifting right, turning right, proceeding straight and backing up. Each action has a unique value so it can be identified in a lookup table. A mode filter 26 determines the most common value within each sampling period to become part of a running data stream represented by block 28. The filtered vehicle action data is provided as a second input 30 to the processor 20.

Figures 2, 3:
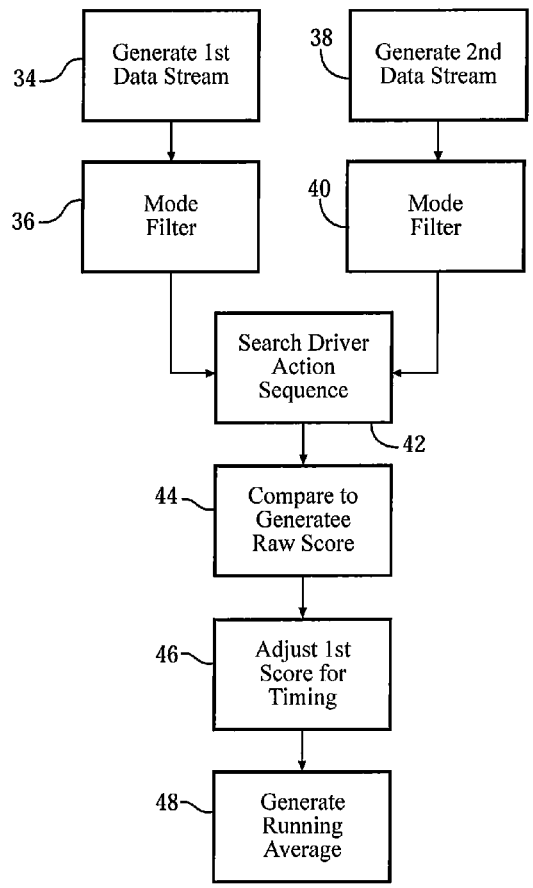
FIG. 2 is a flow chart of an illustrative processing sequence associated with the method described above.
FIG. 3 is a timing chart of a portion of a data stream.

With respect to FIG. 2, it will be seen that the process is operative at step 42 to select, for each vehicle action having a value other than zero, a set of filtered driver action data within the ten second window wherein some of the data represents driver actions taken early in or just prior to the vehicle move and some of the data represents driver actions taken late in or after the vehicle is moving. The processing step 44 includes comparing the driver action sequence to an ideal sequence stored in memory 32 associated with processor 20 to produce a score having a numerical value of between 0-1 representing the degree of correspondence between the actual driver action taken and an ideal sequence which is used as a standard. A numerical score between 0-1 is thus established. This is referred to as a "raw score".

At step 46, the processor 20 in conjunction with data stored in memory 32 determines whether the driver actions were timely; i.e., taken not only in the proper sequence but also within time limits determined by a comparison of the actual driver maneuver times to the timing of an ideal sequence stored in memory 32. Driver actions that take too long to occur are given low scores; e.g., 0.1, whereas well-timed actions are given high scores; e.g., 1. The result of this comparison is an adjustment of the raw score at 44 based on the evaluation of the maneuvers without respect of time. For example, if the driver scored a perfect "1" as a result of the evaluation of the first data stream without reference of time, but performed the maneuvers in a timing sequence which was below average so as to result in an adjustment of 0.5, the two numbers are multiplied to produce a net score of 0.5. The processor 20 maintains these scores as a running average 48 so that at the end of the test the driver and/or evaluator sees a net score of between 0 and 1 and this can be readily compared to previous scored achieved by the same driver at earlier times. The driver can thereby determine whether or not he or she is improving with additional training and/or experience.

Referring to FIG. 2, the process methodology will be described in more detail with the understanding that this methodology can be used for the production of code for programming processor 20 in the form of, for example, a mini-computer or microcontroller of the type available from numerous sources. Block 34 represents the activity of the camera 10 to produce data 12 in FIG. 1. The data stream represented by block 34 represents driver head position in the simplest case and a combination of head and eye position in the more complex case. The stream is treated as a sequence wherein each position in the sequence represents a different data element; e.g., glance left, look full left, check rear view mirror, look straight ahead, etc. Each data element has a time duration associated therewith and the filtering step represented by block 34 eliminates the short term movement by recording only the most common value within the sampling period.

Block 38 represents the activity of the vehicle transducers shown at block 22 in FIG. 1 so as to generate a second data stream representing the presence or absence of vehicle maneuvers or motions during a series of intervals which correspond to the time intervals associated with the data stream 34 so that the vehicle actions can be correlated to the driver actions as necessary to make the final evaluation.

Block 40 represents the fact that short duration vehicle maneuver deviations are filtered out during each sampling period.

The function of block 42 is to search for a driver action sequence during each element or segment of the vehicle action data stream to determine (a) whether the driver has taken any of the necessary actions and (b) the order in which those actions were taken. As stated above, it is necessary for the first data stream to be presented as a sample "window" of approximately 10 seconds in length so that the correlation, if found, has driver action elements both before and after the vehicle motion elements in the compared sequences. This is because some driver actions precede the vehicle action; e.g., the driver is expected to check the outside left hand rear view minor and the left window blind spot before making a lane change or left turn. This function is best understood by looking at the diagram of FIG. 3. The top line illustrates a stream of recorded driver actions, in this case head pose (position) and eye gaze direction. Four actions have been recorded, each with a time duration long enough to pass the mode filter 14. In other words, short term movements have been filtered out of the stream as seen in FIG. 3. The bottom line represents a stream of data from vehicle actions; as expected, most of the time no actions are recorded. However, in the illustrated case, a "drift left" action representing a lane change with a duration of 1.1 second has been recorded. The processor 20 thus looks at the 10-second interval in the driver data stream associated with the vehicle action to see what, if anything, the driver has done. In this case, a sequence of looking left, checking the mirror, looking straight and making a speed check has occurred. Note that the 10 second window of driver action data starts before the vehicle action and continues until after the vehicle action is completed. This data is compared to a desired driver action sequence and, if a match occurs, a core of "1" is calculated. A less than perfect match produces lower scores.

After block 42, the raw score is generated for each driver maneuver as explained above. The driver scores a 1 if he or she has performed each of the movements specified by an ideal standard from memory 32 or some lesser score if the driver has performed only some of the necessary actions. If none of the desired actions has occurred, the score is "0".

At block 46, this raw score is adjusted based on timing information in the first data stream 34; i.e., driver actions that take too long will be adjusted downwardly and the adjustment is based on a comparison to ideal times generated by more experienced or professional drivers performing the same actions or functions. The timing score is used as a multiplier against the action score in block 44 to produce an adjusted score. For example, a raw score of "1" and a timing score of 0.5 produces a net score of 0.5. The score from one event is generated from a learned kernel function from a test set of experience drivers. At block 48, a final scoring can be done by averaging all of the kernel scores and computing a percentile ranking based on a Gaussian distribution of scores.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A training method for evaluating driver performance relative to a standard set by other fully trained drivers comprising:

using a vehicle-mounted camera system to generate a first data stream of driver action sequences representing sequences of driver head position changes and eye gaze direction changes made by a driver during the performance of a series of specific pre-defined vehicle maneuvers;

using a system of vehicle mounted sensors to generate a second data stream representing the series of specific pre-defined maneuvers;

using a processor to produce a score for each driver action sequence correlated to a specific driver-initiated vehicle maneuver from the second data stream as measured against a data set representing ideal driver action sequences, the ideal driver action sequences determined from monitoring different, fully trained drivers performing the same maneuver in an ideal fashion and recording corresponding head position change and eye gaze direction change data from said drivers; and adjusting each score based on a comparison of the times required by the driver to perform said head position and eye gaze direction actions in each scored sequence relative to a timing standard so as to provide a total numerical score for an evaluator to compare to the driver's previous scores to determine the extent to which a driver under examination is progressing.

2. A method as defined in claim 1 including the further step of filtering from the first data stream driver actions having a duration of less than a pre-determined value.

3. A method as defined in claim 1 wherein the first data stream is structured to represent driver action sequences within a moving sampling window such that for each vehicle action in the second data stream, driver actions occurring both early in or prior to as well as late in or after a vehicle action are available for scoring purposes.

4. A method as defined in claim 1 including the further step of determining a running average of the scores.

5. A method as defined in claim 1 wherein the driver actions include looking left, looking partial left for side view mirror check, speed check, straight ahead and center rear view mirror check.

6. A method as defined in claim 1 wherein the vehicle actions include lane changes, backing up and turns.

* * * * *